United States Patent
Reineccius et al.

(10) Patent No.: US 9,333,871 B2
(45) Date of Patent: *May 10, 2016

(54) AUTOMATIC AUTHENTICATION FOR SERVICE ACCESS FOR FUELING OF VEHICLES

(71) Applicant: PowerTree Services, Inc., San Francisco, CA (US)

(72) Inventors: Stacey Reineccius, San Francisco, CA (US); Franklin Gobar, San Rafael, CA (US); John C. Sellers, El Cerrito, CA (US)

(73) Assignee: POWERTREE SERVICES, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,700

(22) Filed: Jan. 5, 2015

(65) Prior Publication Data

US 2015/0151647 A1 Jun. 4, 2015

Related U.S. Application Data

(63) Continuation of application No. 13/827,753, filed on Mar. 14, 2013, now Pat. No. 8,967,466.

(60) Provisional application No. 61/750,631, filed on Jan. 9, 2013.

(51) Int. Cl.
   *G06F 7/08* (2006.01)
   *B60L 11/18* (2006.01)
   *G06K 19/077* (2006.01)

(52) U.S. Cl.
   CPC ......... *B60L 11/1846* (2013.01); *B60L 11/1818* (2013.01); *B60L 11/1824* (2013.01); *G06K 19/07758* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
   USPC .......................... 235/375, 381, 383, 451, 492
   See application file for complete search history.

(56) References Cited

U.S. PATENT DOCUMENTS

| | | | | |
|---|---|---|---|---|
| 5,327,066 A | * | 7/1994 | Smith | 320/109 |
| 2006/0187046 A1 | * | 8/2006 | Kramer | 340/572.3 |
| 2010/0328057 A1 | * | 12/2010 | Liu | 340/438 |
| 2011/0100507 A1 | * | 5/2011 | Weitzhandler et al. | 141/94 |
| 2012/0166269 A1 | * | 6/2012 | Payne et al. | 705/14.27 |

* cited by examiner

*Primary Examiner* — Tuyen K Vo
(74) *Attorney, Agent, or Firm* — Stoel Rives LLP

(57) ABSTRACT

Systems, methods, and devices for refueling a vehicle are discussed herein. A vehicle charging station includes a power distribution interface, a receiver component, and an authorization component. The power distribution interface is configured to provide electrical power to a power receiving interface of a vehicle. The receiver component determines identification information that uniquely identifies the vehicle. The receiver component is positioned to determine the identification information corresponding to the vehicle when the power receiving interface is in electrical communication with the power distribution interface. The authorization component is configured to allow flow of electrical power to the vehicle in response to authorization based on the received identification information.

25 Claims, 9 Drawing Sheets

US 9,333,871 B2

AUTOMATIC AUTHENTICATION FOR SERVICE ACCESS FOR FUELING OF VEHICLES

RELATED APPLICATIONS

This application claims priority to and the benefit of U.S. patent application Ser. No. 13/827,753 filed on Mar. 14, 2013 entitled "Automatic Authentication for Service Access for Fueling of Vehicles" which claims priority to and the benefit of U.S. Provisional Patent Application No. 61/750,631 entitled "Automatic Authentication for Service Access for Fueling of Vehicles" filed on Jan. 9, 2013, both of which are hereby incorporated herein by reference in their entirety.

TECHNICAL FIELD

The present disclosure relates to vehicle refueling and more particularly relates to vehicle identification for refueling.

DETAILED DESCRIPTION OF PREFERRED EMBODIMENTS

Figure 1:
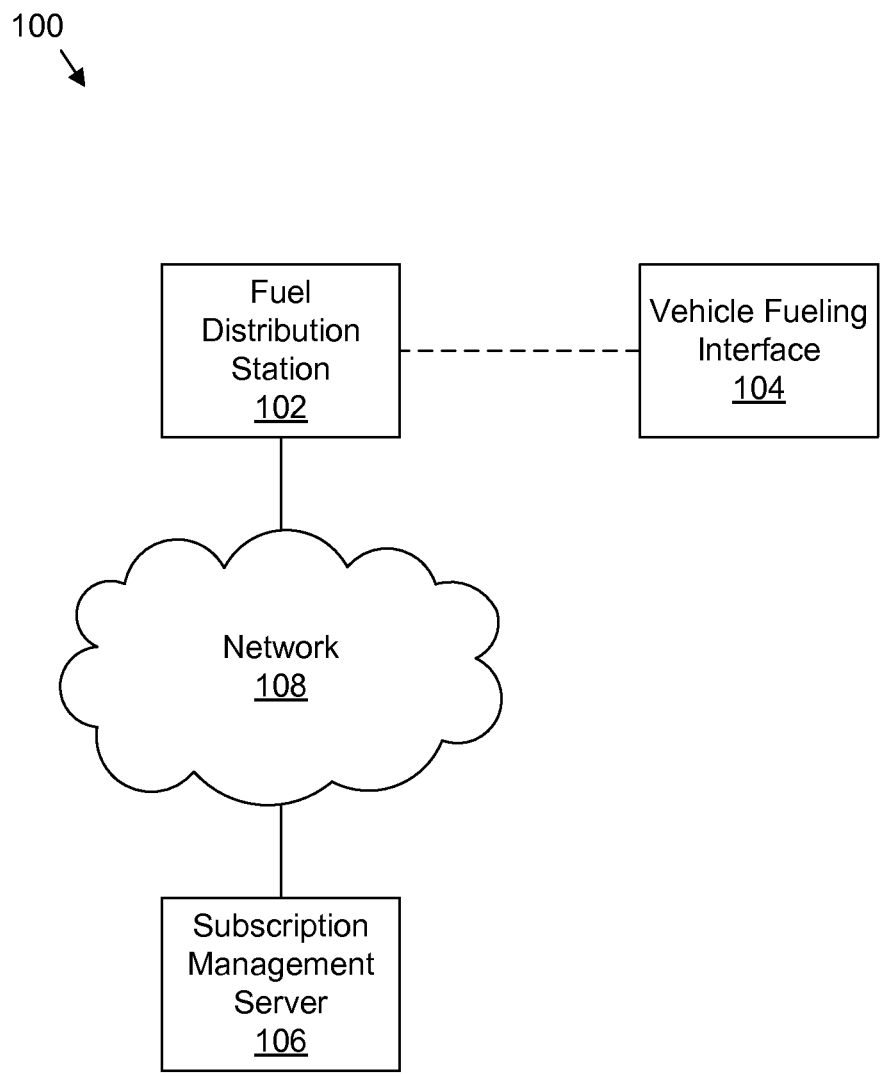
FIG. 1 is a schematic diagram illustrating a fuel distribution system consistent with embodiments disclosed herein.

Vehicle refueling systems generally operate in an unprotected mode or a protected mode. In unprotected modes, or promiscuous modes, anyone with physical access to the refueling system is allowed to refuel without authentication or payment. In a protected mode, users are generally required to authenticate or pay in some manner before being allowed to refuel a vehicle. Generally, payment or authentication is performed using a card, such as a payment card or authentication card, that can be read by a reader of the refueling system. Example payment cards include credit cards, debit cards, or the like. Example authentication cards include any type employee card, membership cards, or even payment cards that may be used to authorize refueling. Generally, payment cards and authentication cards are in a form similar to a credit card, key ring mounted card, or the like. These authentication and identification cards are generally read using a card reader, such as a magnetic card reader, an RFID card reader, or other type of contact or proximity reader.

However, these methods for refueling have a number of significant limitations and disadvantages. First, the above methods make it difficult or impossible to identify the specific vehicle that is being refueled. Because the authentication or payment cards can be passed from one person to the next, the cards may be shared and the same card may be used to fuel multiple vehicles. This loaning potential makes it impossible to be reasonably certain that a specific vehicle is being fueled or that fueling privileges are being used correctly. This allows for potential theft of service and prevents certainty in knowledge of costs and, as such, presents limits on potential service offerings attractive to customers.

Second, the above methods require significant physical and communication infrastructure. For example, credit card readers, display screens, high speed communication connections, and the like are required in order to process payments and/or authenticate an individual or card. Both the physical infrastructure and communication subscriptions add to the cost of refueling for the customer.

Third, a significant amount of manual interaction with an authentication device is required each time a vehicle is refueled. For example, a user may need to swipe a card, enter a personal identification number, and wait for a remote server to authorize fueling, all before any refueling can begin to take place. Furthermore, the cards must be carried by the user and loss of the authorization card presents inconvenience, and likely, the loss of service to the customer.

Fourth, payment and authorization with a remote server must be performed each refueling occurrence. This results in higher communication demands and also introduces the potential for credit card transaction fees and bank fees with every refueling transaction. Furthermore, no revenue can be recognized from the station unless a transaction is completed under generally accepted account principles (GAAP). This makes it impossible to provide a certainty of revenue recognition timing, further complicating accounting and raising per transaction costs.

The above discussed limitations result in significant limits upon the types of subscriptions and services that can be provided to customers. For example, customers are required to pay, based on either the unit of time or the unit of fuel delivered upon each refueling occurrence. Because either the unit time or unit energy delivered must be tracked for each transaction, tracking costs must be taken into account and charged to the customer. Similarly, costs for customer support and revenue recognition must also be accounted for. In some cases, the costs of tracking, customer support and revenue recognition can add significant costs and can even be equal to or greater than the cost of fuel provided. For example, the overhead costs for a fuel distribution station to operate can match or be even greater than the cost of the fuel that is provided.

Based on the foregoing, applicants have recognized that a need exists for simpler and faster identification, as well as for secure identification and authentication for a specific vehicle. Applicants have recognized that, by identifying a specific vehicle, certainty as to identity and fueling requirements can be obtained, convenience can be improved for the customer, and complexity of billing management can be reduced, along with the associated costs for such fuel service delivery. Additionally, identifying a specific vehicle allows for subscription-based refueling where the specific vehicle may be refueled an unlimited amount within a specific subscription period.

As used herein, the term refueling, fueling, and the like are given to encompass any form of replenishing fuel, an electric charge, or any other energy source for a vehicle or other energy consumption device. For example, the term refueling and fueling are given to encompass providing a liquid fuel, a gaseous fuel, or even recharging batteries. Similarly, as used herein, the term fuel is given to mean any energy in whatever form consumed by a vehicle or energy consumption device. For example, the term fuel, as used herein, is given to encompass any liquid or gaseous fuels, such as gasoline or hydrogen. The term fuel is also given to encompass other forms of energy such as electricity, electrical charge, and the like.

Turning to the figures, FIG. 1 is schematic diagram illustrating a fuel distribution system 100. The fuel distribution system 100 includes a fuel distribution station 102, a vehicle fueling interface 104, and a subscription management server 106. The subscription management server 106 and the fuel distribution station 102 are shown in communication over a network 108. The vehicle recharging system 100 may be configured to refuel a vehicle or other refuelable or rechargeable device.

The fuel distribution station 102 may include any type of refueling station. For example, the fuel distribution station 102 may include a gas station with one or more pumps and/or may include a recharging station with one or more outlet plugs. For example, the fuel distribution station 102 may represent each fuel pump at a gas station or recharging station. Alternatively, a single fuel distribution station 102 may have multiple outlets or pumps. The fuel distribution station 102 may be configured to uniquely identify a vehicle and determine whether the vehicle is authorized for refueling. According to one embodiment, the fuel distribution station 102 is located at a fixed site where vehicles may arrive to be refueled.

According to one embodiment, the fuel distribution station 102 maintains identification information that corresponds to vehicles with active subscriptions. For example, the fuel distribution station 102 may maintain a list of identification information corresponding to vehicles which should be allowed to refuel at the fuel distribution station 102. The fuel distribution station 102 may allow any vehicle that has an active subscription to refuel at the fuel distribution station 102. Maintaining the identification information at the fuel distribution station 102 may significantly reduce communication costs because the subscription management server 106 may not be required to authenticate each refueling transaction with a remote device or server.

The vehicle fueling interface 104 is configured to receive gas, electricity, or other fuel to refuel a vehicle. In one embodiment, the vehicle fueling interface 104 may include a fuel inlet, such as tubing, to receive a liquid fuel. In another embodiment, the vehicle fueling interface 104 includes an electrical inlet that includes conductors to receive electrical energy. The vehicle fueling interface 104 may be mounted on or in a body of a vehicle. For example, an electrical inlet may be integrated into a body of an electric powered vehicle and a fuel inlet may be integrated into a body of a gas powered vehicle. In one embodiment, the vehicle fueling interface 104 is permanently affixed to the vehicle such that it cannot be moved to another vehicle, or may only be moved with a key or specialized tool and/or damage to the vehicle and/or vehicle fueling interface 104.

The fuel distribution station 102 and the vehicle fueling interface 104 are connected by a dotted line to indicate that they may be configured to be selectively coupled. For example, the fuel distribution station 102 may be located at a fixed location where a vehicle that includes the vehicle fueling interface 104 may be periodically brought for refueling. In one embodiment, the fuel distribution station 102 includes an electrical outlet plug, while the vehicle fueling interface 104 includes an electrical vehicle inlet. In another embodiment, the fuel distribution station 102 includes a fuel pump handle for gasoline or other liquid fuel, while the vehicle fueling interface 104 includes a liquid fuel inlet into the vehicle. Some embodiments may include connectors configured to refuel using a gaseous fuel, such as hydrogen.

The subscription management server 106 may be a computing device that periodically provides updates to the identification information maintained by the fuel distribution station 102. For example, the subscription management server 106 may maintain a list of identification information for vehicles that have active subscriptions. The subscription management server 106 may periodically update this list, or download changes to the list to fuel distribution station 102. In one embodiment, the subscription management server 106 does not provide updates in a real-time manner. For example, the subscription management server 106 may periodically provide updates based on all the changes that have occurred within an update period. The update period may include one hour, multiple hours, one day, one week, one month, or the like. The infrequent updates may result in significant savings in communication costs. In one embodiment, the per transaction costs can be reduced to one list update per update period or less, which may potentially save a significant amount of costs.

Figure 2:
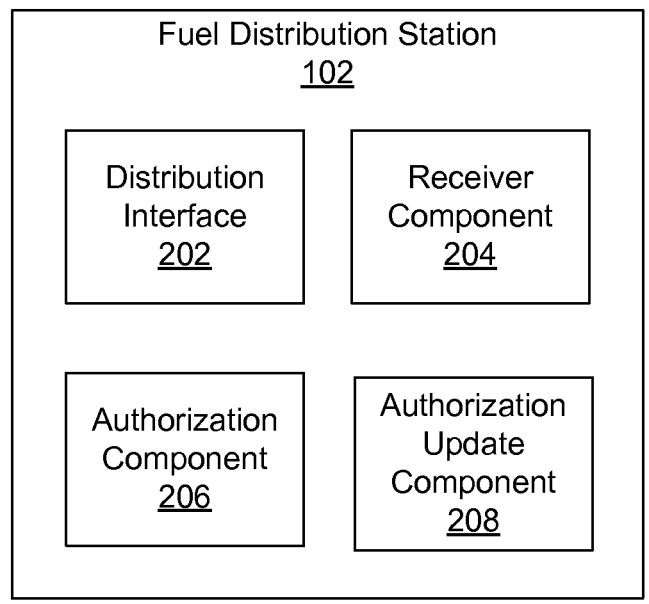
FIG. 2 is a schematic diagram illustrating a fuel distribution station consistent with embodiments disclosed herein.

FIG. 2 is a schematic block diagram illustrating components of the fuel distribution station 102. The fuel distribution station 102 includes a distribution interface 202, a receiver component 204, an authorization component 206, and an authorization update component 208. The components 202, 204, 206, and 208 of the fuel distribution station 102 are given by way of example only. One or more of the components 202, 204, 206, and 208 may be omitted and/or additional components may be included, depending on the embodiment.

The distribution interface 202 is an interface configured to provide fuel to a vehicle. The distribution interface 202 may be configured to couple with a fuel receiving interface of a vehicle, such as the fuel receiving interface 302 discussed in relation to the vehicle fueling interface 104 of FIG. 3.

In one embodiment, the distribution interface 202 is configured to provide a liquid fuel to a vehicle. For example, the distribution interface 202 may include tubing from a body of a gas pump and through a gas pump handle through which gasoline is provided to a vehicle. The fuel distribution station 102 may pump fuel through the distribution interface 202 to fill up a gas tank or other storage system of the vehicle.

In another embodiment, the distribution interface 202 is configured to provide electrical energy to a vehicle. For example, the distribution interface 202 may include a power distribution interface for electrically coupling with and providing electrical power to a power receiving interface of a vehicle, such as the fuel receiving interface 302 discussed in relation to the vehicle fueling interface 104 of FIG. 3. In one embodiment, the power distribution interface includes a power cable extending from the fuel distribution station 102. The power distribution interface may include an outlet plug on the end of the power cable through which electrical energy may be passed to a vehicle. In one embodiment, the outlet plug, power cable, and other aspects of the distribution interface 102 and/or fuel distribution station 102 comply with a vehicle recharging standard. Examples of vehicle recharging standards include the society of automotive engineers (SAE) J1772 standard, the CHAdeMO standard, or the like. In some embodiments, outlet plugs or interfaces that comply with other recharging standards or derivatives of these standards may be used.

In one embodiment, the distribution interface 202 may not need to physically contact a vehicle or fuel receiving interface 302 of a vehicle to provide electrical power. For example, the distribution interface 202 may include a wireless power coupling that is configured to electrically couple wirelessly with a wireless power coupling of a vehicle. The wireless power couplings of the distribution interface 202 and the vehicle may include coils of wire with corresponding sizes. One of skill in the art will recognize considerable variation for wireless power couplings and/or proximity charging that may be used for refueling an electric vehicle.

In one embodiment, the distribution interface 202 and/or fuel distribution station 102 may include an indicator light to indicate a refueling status for a vehicle. For example, a single or multicolor indicator light may be controlled according to multiple states to indicate whether a distribution interface 202 is connected with a vehicle, whether a vehicle is authorized for refueling, progress in the refueling process, and/or whether refueling is complete.

The receiver component 204 is configured to receive identification information from a vehicle. The receiver component 204 may receive identification information that uniquely identifies a vehicle. For example, the receiver component 204 may include an RFID tag reader that may be used to read RFID tags on the vehicle. In one embodiment, each RFID tag on a vehicle includes unique identification information which may be used by the fuel distribution station 102 to identify the vehicle.

The receiver component 204 may be positioned to align with an identification component of a vehicle when the distribution interface 202 is connected with a fuel receiving interface 302. For example, the receiver component 204 may be positioned such that it may receive identification information from the vehicle when the fuel receiving interface of a vehicle fueling interface 104 is coupled to the distribution interface 202. In one embodiment, the receiver component 204 includes an antenna in the distribution interface 202 that aligns with an RFID tag or other identification component of a vehicle when the fuel distribution station 102 and a vehicle fueling interface 104 are coupled for fueling. In one embodiment, the receiver component 204 may be located within a portion of the distribution interface 202, such as within an outlet plug, power cable, fuel pump handle, or other location of the fuel distribution station 102. In one embodiment, the receiver component 204 includes an RFID tag reader in an outlet plug of the distribution interface 202 and the RFID tag reader includes an antenna to activate and/or receive data from an RFID tag.

In one embodiment, the receiver component 204 may receive the identification information in response to coupling of the distribution interface 202 and the fuel receiving interface. For example, the receiver component 204 may be configured to query and/or receive the identification information in response to the distribution interface 202 being coupled to a vehicle fueling interface 104. In one embodiment, the receiver component 204 includes an RFID tag reader that reads a passive, active, or battery assisted passive RFID tag. In one embodiment, the RFID tag reader provides a valid passcode to the RFID tag before the RFID tag will provide the identification information.

In one embodiment, the RFID tag can store a unique security code that is changed by a signal from the vehicle fueling interface 104 after each fueling session and then sent by the fuel distribution station 102 and/or to the subscription management server 106 during the next regular periodic update for dissemination to other vehicle fueling stations. This security code can protect against a duplication of the tag and assures that a single vehicle ID can only be used in a single fueling session at a time.

The authorization component 206 is configured to allow refueling of a vehicle based on identification information received by the receiver component 204. For example, the receiver component 204 may receive identification information and the authorization component 206 may determine whether the received identification information is valid and/or corresponds to an active account or subscription. In one embodiment, the authorization component 206 compares the identification information to a list of authorized identification information. For example, if the identification information corresponds to an entry in the list, the authorization component 206 may determine that the vehicle is authorized for refueling. If the identification is valid and/or corresponds to an active account or subscription, the authorization component 206 may authorize the refueling of the vehicle. For example, the authorization component 206 may allow electrical power, gasoline, hydrogen, or any other type of fuel to flow to the vehicle.

In one embodiment, the fuel distribution station 102 may include a flow component (not shown) for selectively allowing flow of fuel to a vehicle. For example, the flow component may include an electrical switch, a pump, or other devices that can be used to selectively allow, cause, or block flow of a fuel to the vehicle. In one embodiment, the flow component may be controlled by the authorization component 206. For example, the authorization component 206 may place the flow component in a state that allows flow when a vehicle is authorized and may place the flow component in a state that does not allow flow when a vehicle is not authorized or the distribution interface 202 is not connected to a vehicle.

The authorization update component 208 may periodically update information that indicates which vehicles are authorized for refueling. For example, the authorization update component 208 may periodically receive information from a subscription management server 106 to update a list of identification information that correspond to vehicles which should be allowed to refuel. In one embodiment, the authorization update component 208 is configured to check for updates every hour or more, every day or more, or on some other time period. According to one embodiment, infrequent updates may decrease costs for a communication connection and thereby reduce fueling costs or subscription costs to customers. On the other hand, more frequent updates may allow for a fuel distribution station 102 to reflect a more current status for all vehicle that are allowed to be recharged.

Figure 3:
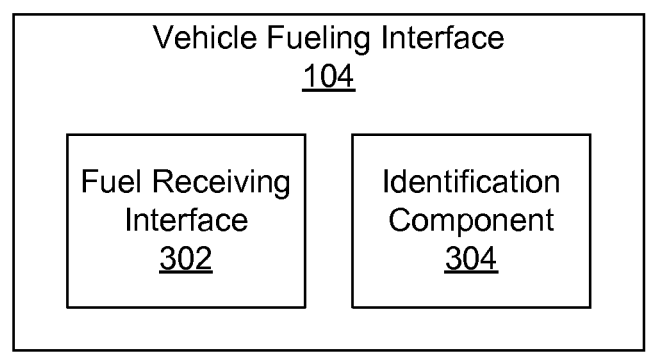
FIG. 3 is a schematic diagram illustrating a vehicle fueling interface consistent with embodiments disclosed herein.

FIG. 3 is a schematic block diagram illustrating components of the vehicle fueling interface 104. The vehicle fueling interface 104 includes a fuel receiving interface 302 and an identification component 304. Additional, fewer, or alternate components may be included in some embodiments.

The fuel receiving interface 302 is configured to receive fuel from the fuel distribution station 102. The fuel receiving interface 302 may be configured to couple with a distribution interface of a fuel distribution station 102, such as the distribution interface 202 discussed above in relation to the fuel receiving interface 104 of FIG. 2. In one embodiment, the fuel receiving interface 302 is configured to receive liquid fuel and direct it to a storage system of the vehicle. For example, the fuel receiving interface 302 may include a liquid fuel inlet and tubing from the inlet to a gas tank.

In another embodiment, the fuel receiving interface 302 includes a power receiving interface configured to electrically couple with and receiving electrical power from the distribution interface 202. In one embodiment, the fuel receiving interface 302 includes a vehicle inlet that includes a conductor configured to physically mate with an outlet plug of the distribution interface 202. For example, the fuel receiving interface 302 may include a female inlet that includes conductors for contacting male outlet conductors of the distribution interface 202. The electrical power may be used to recharge batteries or other power storage system of a vehicle. The fuel receiving interface 302 may include an electrical inlet which may be used to receive electrical energy and pass it to a power storage system of the vehicle. In one embodiment, the vehicle inlet, power storage system, and other aspects of the vehicle fueling interface 104 and/or vehicle may comply with a vehicle recharging standard. Examples of vehicle recharging standards include the society of automotive engineers (SAE) J1772 standard, the CHAdeMO standard, or the like. In some embodiments, vehicle inlets that comply with other recharging standards or derivatives of these standards, without limitation, may be used.

In one embodiment, the fuel receiving interface 302 and distribution interface 202 may not need to make physical contact to electrically recharge a vehicle. For example, the fuel receiving interface 302 may include a wireless power coupling that is configured to electrically couple wirelessly with a wireless power coupling of the fuel distribution station 102. The wireless power couplings of the fuel receiving interface 202 and the fuel distribution station 102 may include coils of wire with corresponding sizes. One of skill in the art will recognize considerable variation for wireless power couplings and/or proximity charging that may be used for refueling an electric vehicle.

The fuel receiving interface 302 and/or the vehicle fueling interface 104 may be integrated within a body of a vehicle. For example, the fuel receiving interface may include tubing, wiring, and/or other portions that are integrated with a body of the vehicle. The fuel receiving interface 302 may be difficult or impossible to remove without damaging the fuel receiving interface 302 or the vehicle. According to one embodiment, a fuel receiving interface 302 that is integrated within a body of a vehicle is more difficult to remove or alter than a cable extending from the vehicle, or the like. For example, cables may be spliced, swapped, or modified more freely than an inlet mounted within the body of a vehicle.

The identification component 304 provides identification information to a fuel distribution station 102. The identification information may uniquely identify a vehicle on which it is mounted. For example, the identification information may include a unique identification number, an account number, or any other information that may be used to uniquely identify a vehicle.

The identification component 304 may be positioned to align with a receiver component 204 of the fuel distribution station 102 when the fuel receiving interface 302 is coupled to the distribution interface 202. The alignment of the identification component 304 with the receiver component 204 may allow electrical communication between the identification component 304 and the receiver component 204. For example, the identification component 304 may include a passive, active, or battery assisted passive RFID tag that stores identification information. The RFID tag may be mounted on a vehicle inlet, such that an RFID tag reader in the outlet plug aligns with the RFID tag when the inlet and outlet plug are coupled. The RFID tag may provide the identification information in response to a query from an RFID tag reader of the receiver component 204. In one embodiment, the identification component 304 may require a valid passcode before providing the identification information.

In one embodiment, the identification component 304 may be permanently affixed to a vehicle. As used herein, the term permanently affixed is given to mean that the identification component 304 is affixed or mounted on a vehicle in a manner that it is not removable in a functional state, requires a specialized key or tool for removal, and/or is only removable with damage to the vehicle. For example, the identification component 304 may not be removable from the vehicle while maintaining the identification component 304 of identification information in a functional state. In one embodiment, the identification component 304 is mounted on a vehicle inlet which is permanently affixed to the vehicle. The identification component may not be removable because of how it is mounted, such as by using a strong and permanent adhesive, embedded in an object, or the like.

In one embodiment, the identification component 304 is not removable from the vehicle without damaging the identification component 304. For example, the identification component 304 may be securely glued, welded, or embedded within the vehicle, body of the vehicle, or portion of the vehicle that it can only be removed with physical damage to the identification component 304 or the vehicle.

In one embodiment, the identification component 304 self destructs in response to removal from the vehicle. For example, the identification component 304 may be configured to detect removal or attempted removal from the vehicle and the identification component 304 may self destruct. In one embodiment, the identification component 304 self destructs by electronically destroying the identification information. For example, a transitory or non-transitory memory may be erased. In another embodiment, the identification component 304 self destructs by mechanically destroying the identification component 304. For example, if the identification component 304 includes an RFID tag, the RFID tag may be configured to be mechanically destroyed so that it no longer functions and/or that the memory of the RFID tag is damaged or erased.

According to one embodiment, the fuel distribution station 102 and vehicle fueling interface 104 may provide significant benefits with regard to reduced costs and flexibility in the ways that fueling services can be billed. In one embodiment, authentication and refueling may happen automatically. For example, because the receiver component 204 and identification component 304 are aligned, the user may only need to insert the distribution interface 202 into the fuel receiving interface 302 to begin and accomplish fueling. No card swipes, number entry, signatures, or network server based authentication may be needed.

In another embodiment, "sharing" of authorization information or cards is prevented because the identification component cannot be moved to another vehicle and cannot be used to authorize fueling for another vehicle. For example, when the distribution interface 202 and the fuel receiving interface 302 are coupled, the receiver component 204 is blocked from receiving identification information from any other vehicle or device. Similarly, the identification component 304 is also blocked from providing identification information to a different station or interface.

According to one embodiment, because sharing is prevented and because a specific car can be identified, a maximum potential cost for a subscription can be calculated. This allows for various subscription based services and payment that would otherwise not be possible. Furthermore, less infrastructure is needed because there is no need for card readers, display screens, or the like.

Figure 4A:
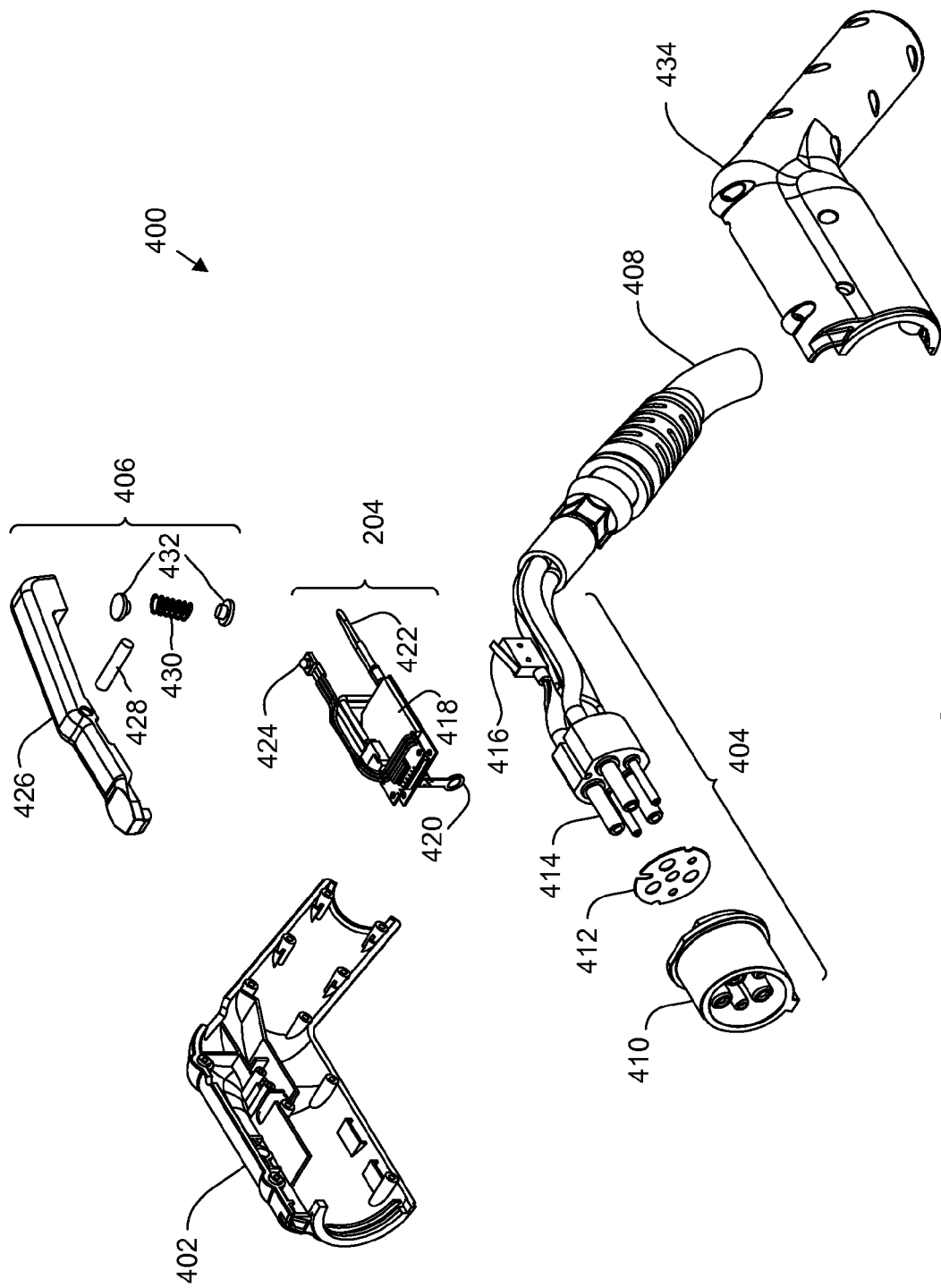
FIG. 4A is an exploded view of an outlet plug of a fuel distribution station consistent with the embodiments disclosed herein.
Figure 4B:
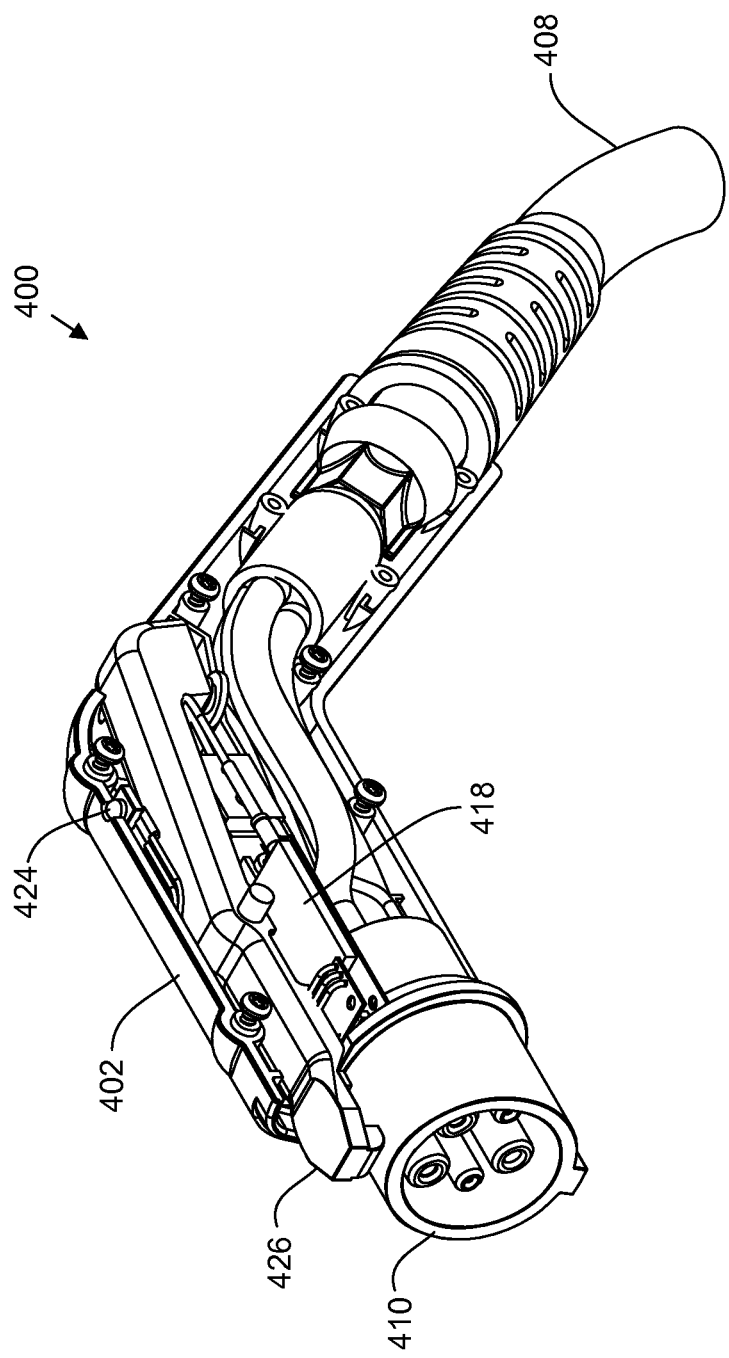
FIG. 4B is an assembled view of the outlet plug of FIG. 4A consistent with the embodiments disclosed herein.

FIGS. 4A and 4B illustrate an outlet plug 400 of a fuel distribution station 102 that complies with a SAE J1772 standard. The outlet plug 400 represents one embodiment of an outlet plug that includes a distribution interface 202 and a receiver component 204. The outlet plug 400 includes a housing formed by a right handle cover 402 and a left handle cover 434. The outlet plug 400 also includes a power distribution interface 404, a receiver component 204, a latch assembly 406, and may be connected to a body of a fuel distribution station 102 by a power cable 408. FIG. 4A illustrates the outlet plug 400 in an exploded view with various parts of the outlet plug 400 unassembled. FIG. 4B illustrates the outlet plug 400 in an assembled view with the left handle cover 434 omitted for internal viewing of the outlet plug 400. Although the embodiment of FIGS. 4A and 4B illustrates a recharging outlet plug, one of skill in the art will recognize that the scope of the present disclosure encompasses a fuel pump handle or other refueling handle or any other interface for refueling a vehicle.

The power distribution interface 404 includes a plug tip 410, a rubber gasket 412, male conductors 414, and a safety switch 416. In one embodiment, some of the male conductors 414 are used to provide power to recharge a vehicle, while others of the male conductors 414 are use to communicate with a charging system of a vehicle or detect a proximity of a vehicle inlet. The safety switch 416 may be used to break an electrical or communication connection to a vehicle and/or enable an authorization process.

The receiver component 204 includes a receiver board 418 that is connected to an antenna 420 and light emitting diode (LED) 424. The receiver board 418 may include circuitry for querying and/or receiving identification information from a vehicle via the antenna 420. The circuitry of the receiver board 418 may also include circuitry for controlling the LED 424. The LED may include a single color or multi color LED which may be used to indicate an authorization status, charging status, or other status of a connected vehicle or fuel distribution station 102. The receiver component 204 is also connected to one or more communication lines 422 which may be used to communicate with an authorization component 206 or other components of a fuel distribution station 102.

The latch assembly 406 may be used to selectively secure the outlet plug 400 to an inlet of a vehicle. The latch assembly 406 may also be configured to depress the switch 416 each time the latch is pressed and/or the outlet plug 400 is coupled or decoupled from a vehicle. The latch assembly 406 includes a latch 426, dowel pin 428, spring 430, and spring mounts 432.

According to one embodiment, in the assembled state as depicted in FIG. 4B, the antenna 420 resides between the male conductors 414. This location may match a location of an identification component 304 of a vehicle inlet.

Figure 5:
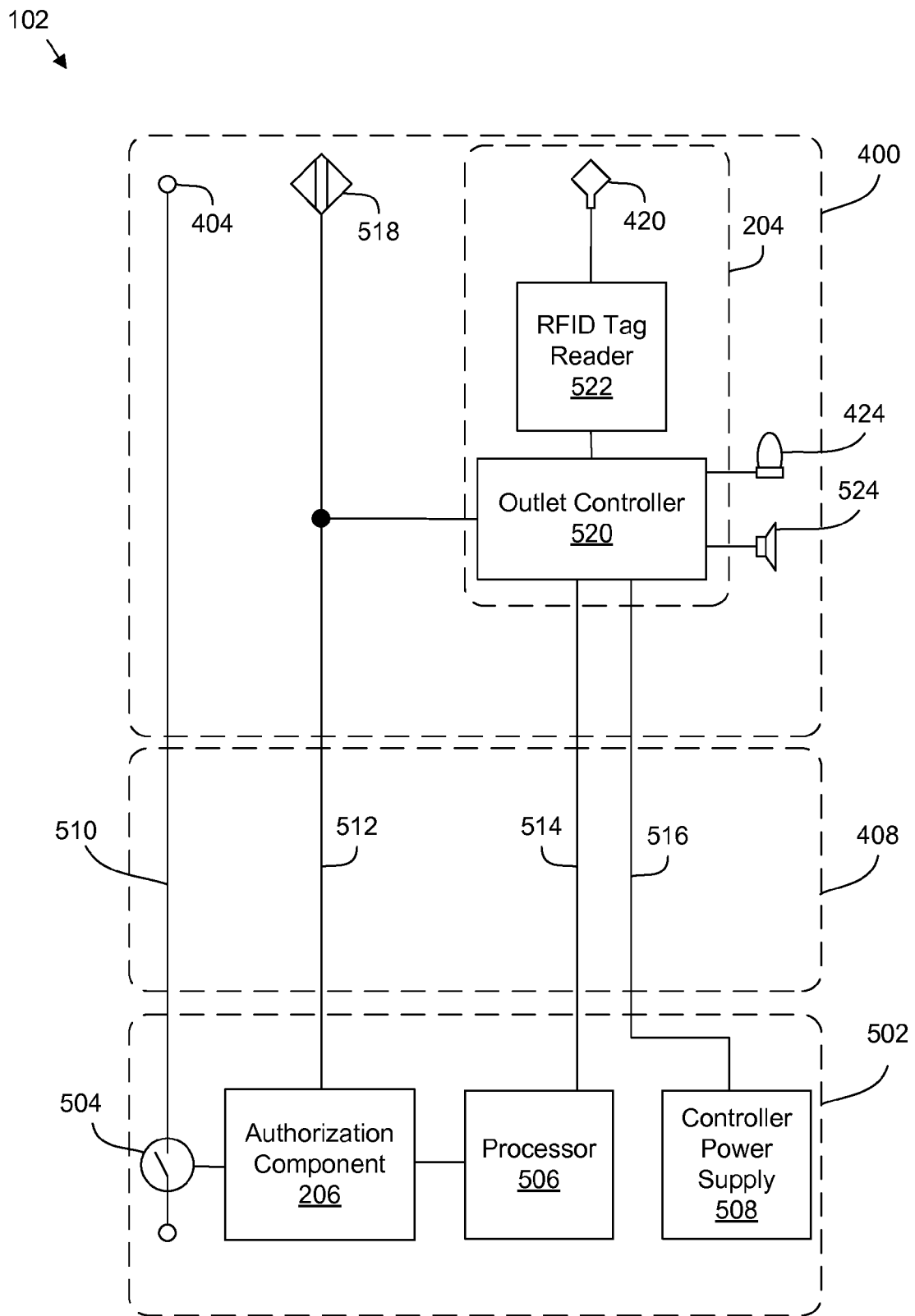
FIG. 5 is a schematic block diagram illustrating electrical interconnection between portions of a fuel distribution station consistent with embodiments disclosed herein.

FIG. 5 is a schematic diagram showing electrical interconnection between portions of a fuel distribution station 102. The fuel distribution station 102, as depicted, includes a station housing 502, a power cable 408, and an outlet plug 400. The station housing includes a flow component 504, an authorization component 206, a processor 506, and a controller power supply 508. The power cable 408 includes a power distribution line 510, a proximity detect line 512, a communication line 514, and a power supply line 516. The lines 510, 512, 514, and 516 may include more than one conductive line. For example, the communication line 514 may include two or more wires for communication between components and the power supply line 516 may include a pair of conductors to provide electrical energy. In one embodiment, the power distribution line 510 may be replaced by a carrier tube for a liquid or gaseous fuel. The outlet plug 400 includes a power distribution interface 404, a proximity detector 518, and a receiver component 204. The receiver component 204 includes an outlet controller 520, an RFID tag reader 522, and an antenna 420. The receiver component 204 is also connected to an LED 424 and speaker 524.

The authorization component 206 receives input from the proximity detector 518 via the proximity line 512 and from the processor 506. The authorization component 206 controls a flow component 504 that includes a switch for selectively allowing flow of electricity to the power distribution interface 404. The processor 506 receives identification information from the receiver component 502 via the communication line 514 and may process and/or provide that identification information to the authorization component 206. The controller power supply 508 provides power to the receiver component 204 via the power supply line 516.

The outlet controller 520 receives an indication of proximity from the proximity detector 518 and identification information via the antenna 420 and RFID tag reader 522. The outlet controller 502 may provide data to and/or receive data from the processor 506. For example, the authorization component 206 may determine whether a vehicle is authorized and provide an indication of authorization or rejection via the processor 506 and communication line 514. The communication line 514 may include any type of communication line that includes multiple conductors or lines. For example, a coaxial cable, twisted pair cable, or other cables may be used.

The outlet controller 520 may control a state and/or color of the LED 424. In one embodiment, the outlet controller 520 turns the LED 424 off when the fuel distribution station 502 does not sense a connected vehicle. The outlet controller 520 may turn the LED 424 on in a solid green when a vehicle is being recharged. If a vehicle is connected but no identification information was received, the outlet controller 520 may cause the LED 424 to blink red. If a vehicle is connected and identification information is detected but not valid, the outlet controller 520 may cause the LED 424 to alternately blink red and then blink green. If the vehicle is disconnected, the outlet controller 520 may turn off the LED 424.

The outlet controller 520 may play sounds via the speaker 524 that indicate a charging status, authorization status, a warning, or other information regarding the fuel distribution station 102 or an attached vehicle.

Figure 6:
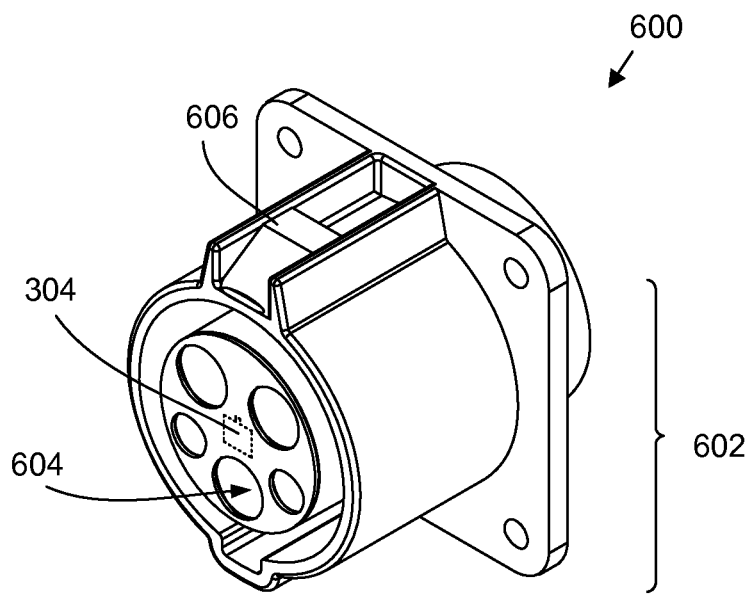
FIG. 6 is a perspective view of a vehicle inlet consistent with embodiments disclosed herein.

FIG. 6 is a perspective view of a vehicle inlet 600. The vehicle inlet 600 is one embodiment of a fuel receiving interface 104 that includes an identification component 304. The vehicle inlet 600 includes an inlet body 602, female conductors within recesses 604, at least a portion of an identification component 304, and a latch ridge 606.

The inlet body 602 and recesses 604, in the depicted embodiment, are configured to mate with the power distribution interface 404 of FIGS. 4A and 4B. For example, the recesses 604 may be shaped to receive the male conductors 414 to allow female conductors to electrically couple with the male conductors 414. The latch ridge 606 is positioned and shaped to engage the latch 426 to retain the plug outlet 400 to the vehicle inlet 600.

In one embodiment, the identification component 304 includes an RFID tag embedded near a surface of the vehicle inlet 600. When the inlet body 602 and the outlet plug 400 are coupled, the RFID tag is positioned to align with the antenna 420 of FIGS. 4A and 4B. The RFID tag and antenna 420 may then be in electrical communication so that identification information can be passed from the RFID tag to the fuel distribution station 102. In one embodiment, the identification component 304 the vehicle inlet 600 may be configured at manufacture to hold an RFID tag or other identification component 304. In other embodiments, an RFID tag or other identification component 304 may be mounted on the vehicle inlet 600 after manufacture or even upon a vehicle inlet of a vehicle. For example, an aftermarket mounting of an identification component 304 may be performed on any vehicle fueling interface 104.

Figure 7:
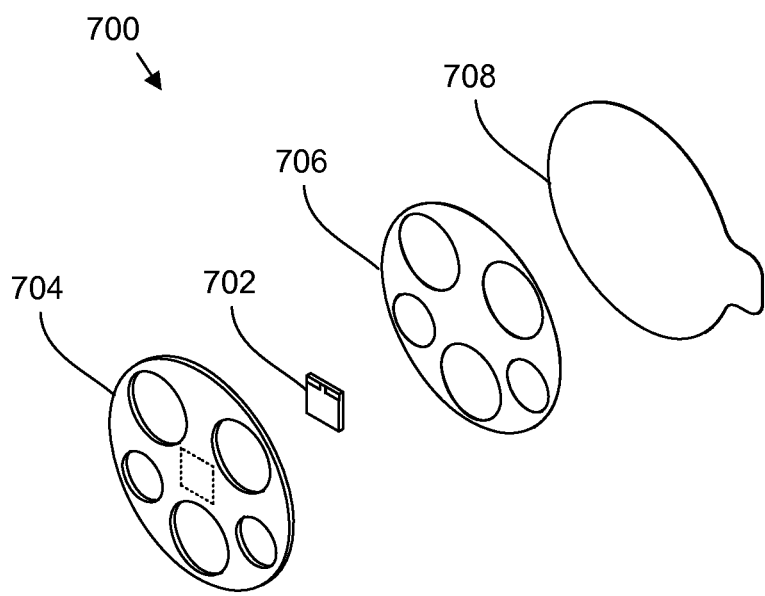
FIG. 7 is an exploded perspective view of a bezel consistent with embodiments disclosed herein.

FIG. 7 illustrates a bezel assembly 700 for mounting an RFID tag 702 on a vehicle inlet 600. In one embodiment, the bezel assembly 700 may be used to perform an aftermarket mounting of an RFID tag 702 on a vehicle with a SAE J1772 compliant vehicle inlet. The bezel assembly 700 includes a tag bezel 704, an adhesive layer 706, and a removable backing 708. The tag bezel 704 is configured to receive the RFID tag 702. The adhesive layer 706 is configured to securely mount the tag bezel 704 and RFID tag 702. In one embodiment, the adhesive layer 706 comprises a pressure sensitive adhesive that is activated when pressure is applied. The removable backing 708 protects the adhesive layer 706 until the bezel assembly 700 is ready for mounting.

In one embodiment, the tag bezel 704 may also include an antenna to allow the RFID tag 702 to communicate with an RFID tag reader. In another embodiment, the RFID tag 702 may be located elsewhere and electrically connected to the antenna positioned proximally to the receiver component 204.

Figure 8:
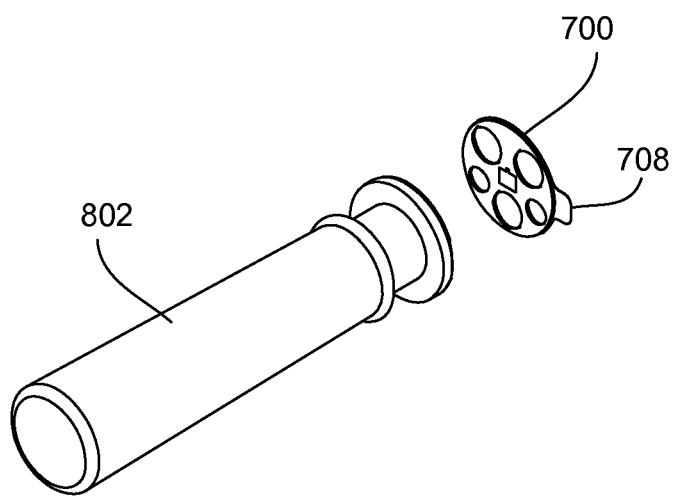
FIG. 8 is a perspective view of a bezel assembly and an applicator consistent with embodiments disclosed herein.
Figure 9:
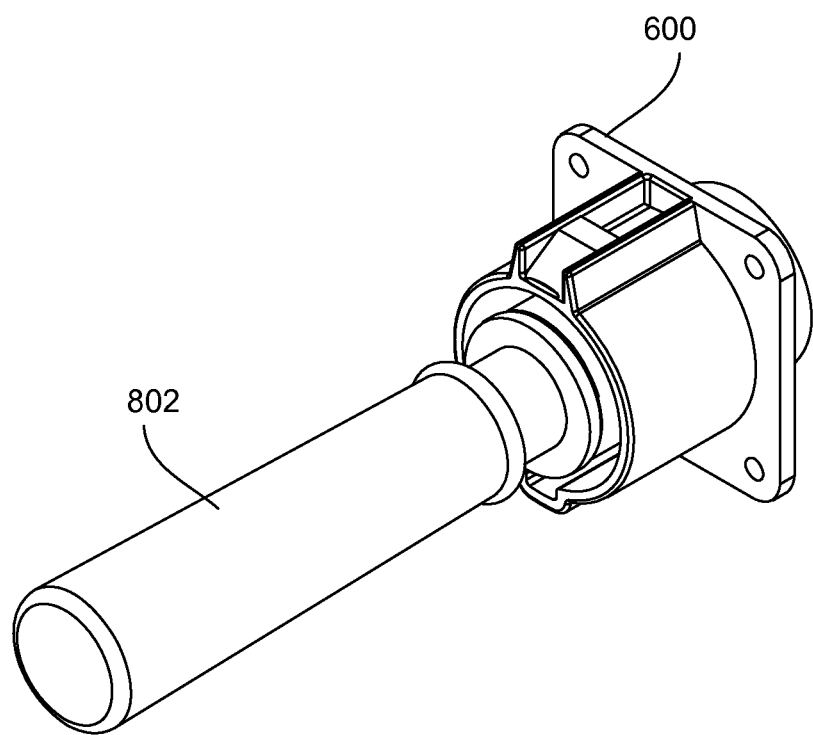
FIG. 9 is a perspective view of an applicator applying a bezel assembly to a vehicle inlet consistent with embodiments disclosed herein.

FIGS. 8 and 9 illustrate mounting of the tag bezel assembly 700 on a vehicle inlet 600. In FIG. 8 the bezel assembly 700 and an applicator 802 are shown. The applicator allows a user to provide pressure to the bezel assembly 700 to secure a tag and bezel assembly to a vehicle inlet. The removable backing 708 is removed before application and the bezel assembly 700 is applied to a vehicle inlet with force. FIG. 9 illustrates the applicator 802 as force is applied to the vehicle inlet 600 to secure the bezel assembly 700 to the vehicle inlet 600.

Figure 10:
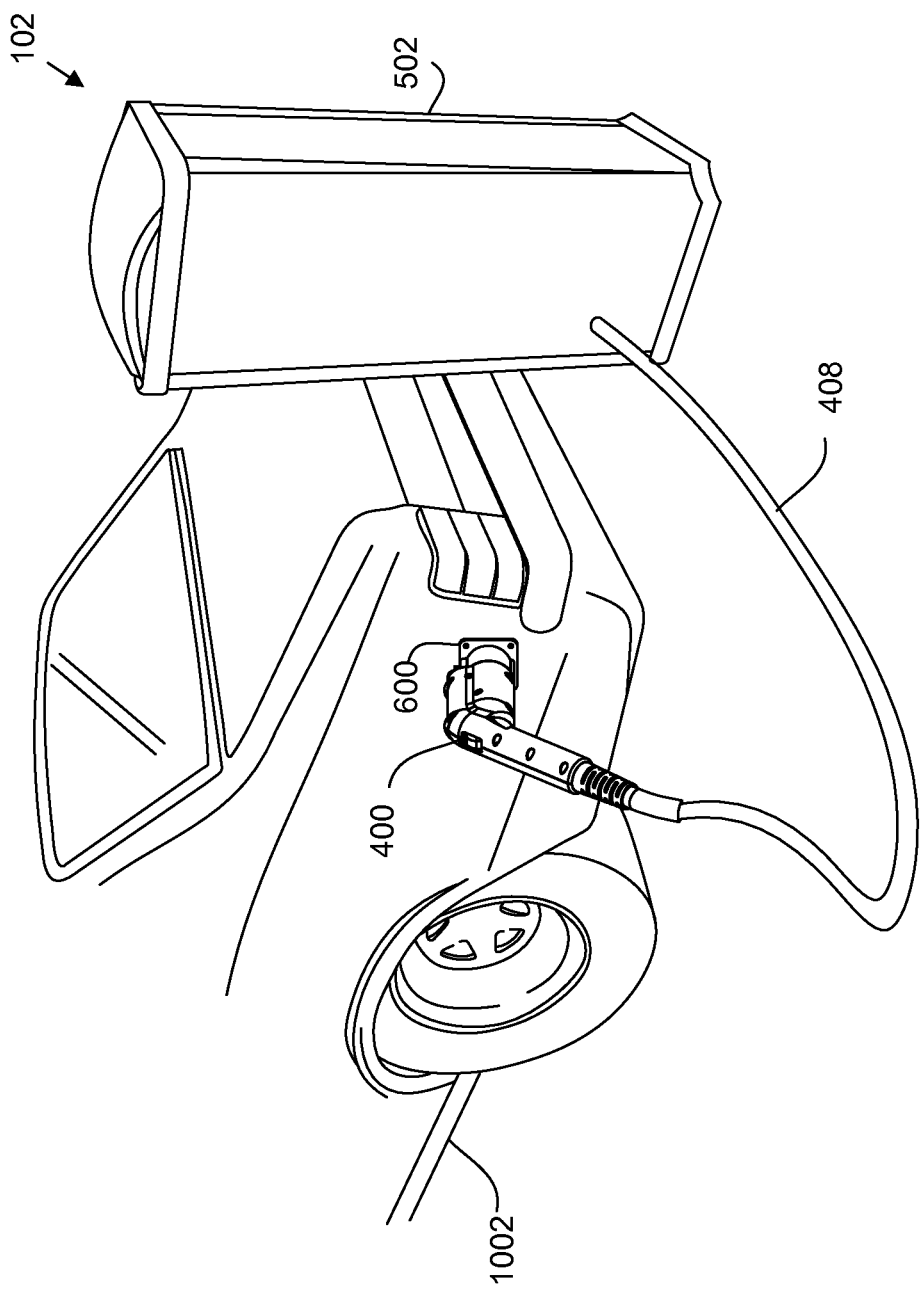
FIG. 10 is a perspective view of a vehicle and fuel distribution station during refueling consistent with embodiments disclosed herein.

FIG. 10 is a perspective view of a vehicle 1002 plugged into a fuel distribution station 102. The fuel distribution station 102 is shown including a station housing 502, a power cable 408, and an outlet plug 400. The power cable 408 extends from the station housing 502 and includes an outlet plug 400. The outlet plug 400 is coupled to a vehicle inlet 600.

Subscription Based Refueling Services

The systems, methods and apparatuses discussed above enable vehicle-based subscription refueling services. For example, because a specific vehicle can be securely identified, subscriptions corresponding to the vehicle for unlimited refueling within a specific time period may be sold. This is because a maximum service and/or refueling usage for the vehicle can be calculated. This is similar to how subscription communication services are often tied to a specific device or phone.

Figure 11:
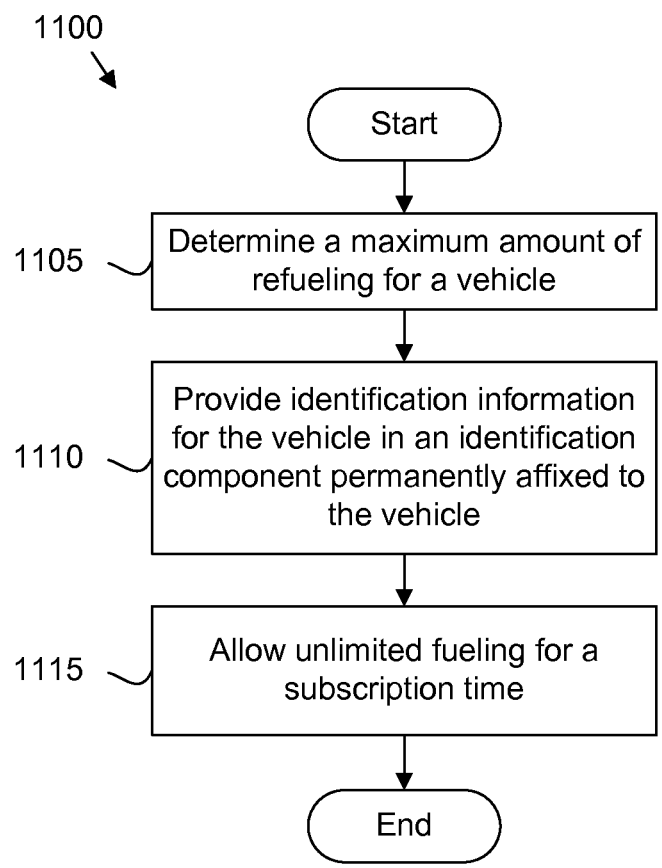
FIG. 11 is a schematic flow chart diagram illustrating a method for providing a refueling subscription consistent with embodiments disclosed herein.

FIG. 11 is a schematic block diagram illustrating a method 1100 for providing a refueling subscription.

The method begins and a maximum amount for refueling a vehicle is determined 1105. For example, a maximum amount of fuel that a vehicle can consume in a month can be calculated based on the efficiency of the vehicle, how long it takes to use a given amount of fuel or energy, and/or how long it takes to refuel a vehicle.

An example of calculating a maximum amount of fuel usage for an electric vehicle will now be discussed. Specifically, assume that a specific electric vehicle is capable of 11 kilowatt hours (KWH) of energy storage, has a 3 kilowatt (KW) charge rate, and has a 12 KWH/hour usage rate. If this vehicle has a minimum interval of four hours between charges, the maximum percentage of time that the vehicle could be charged is:

(11 KWH reserve/3 KW rate of charge)/(11 KWH/12 KW rate of discharge+11 KWH/3 KW rate of charge+4)=(3.6667)/(8.58333)=43%

So the vehicle, at a maximum, could be charged during 43% of a subscription period. For a one month period, the maximum hours would be:

43%*24*30=310 hours

Thus, a provider can know that absolute cost will be 310 hours of recharging, as long as the recharging is restricted to the specific vehicle. Comparatively, if authorization information could be shared across multiple vehicles and/or by multiple people, that maximum amount of charging is much higher and may not even be possible to determine. This is partly because there are no necessary gaps between refueling, as there would be if only one car is allowed to be refueled under a subscription. As an example, assuming a zero interval between charges and no requirement for discharge, because the information may be shared, we see potential non-overlapping usage of (11 KWH/3 KW)/(0 rate of discharge+11 KWH/3 KWH+0 interval delay)=100%, assuming the identification information can only be used with one device at a time. If overlapping is possible (i.e. multiple even at same time) this could be even higher. Thus, securely limiting refueling or recharging to a specific vehicle allows for a significantly reduced and/or actually calculable maximum.

According to one embodiment, determining 1105 the maximum amount can be done in the manner discussed above, or may be looked up in a database of fuel usage information for various cars. For example, a data profile for a vehicle type may be stored and accessed to determine 1105 the maximum amount that a vehicle can be refueled.

The method 1100 continues and identification information is provided 1110 for the vehicle. The identification information 204 may be provided 1110 by programming an already mounted identification component 204, swapping an identification component 204, and/or mounting a new identification component 204. According to one embodiment, a new subscriber will need an RFID tag 702 mounted as illustrated in FIGS. 8 and 9. As discussed above, the identification information may be securely stored within an identification component 204 which cannot be use to fuel other vehicles.

The method 1100 also includes allowing 1115 unlimited fueling at a fuel distribution station for the subscription time period. For example, a user may be able to refuel a vehicle without paying for each refuel and/or with any tracking of the refuel. For example, the individual will not need to pay any extra money for refueling as the vehicle has a corresponding unlimited subscription. In one embodiment, the recharging of the vehicle will be allowed 1115 in response to the fuel distribution station 102 receiving the identification information. For example, the fueling of the vehicle may be allowed 1115 based on identification information corresponding to a current subscription listed in an authorization list maintained by the fuel distribution station.

In addition, the method 1100 may also include updating an authorization list at the fuel distribution station. This may include deleting information corresponding to accounts or subscriptions that have expired as well as adding information corresponding to new accounts or subscriptions. In one embodiment, authorization list may only be updated on a period greater than or equal to about one hour. In another embodiment, the authorization list may only be updated on a period greater than or equal to about one day. In another embodiment, the authorization list may only be updated on a period greater than or equal to about one week.

Various aspects of certain embodiments may be implemented using hardware, software, firmware, or a combination thereof. As used herein, a software component may include any type of computer instruction or computer executable code located within or on a non-transitory computer-readable storage medium. A software component may, for instance, comprise one or more physical or logical blocks of computer instructions, which may be organized as a routine, program, object, component, data structure, etc., that performs one or more tasks or implements particular abstract data types.

In certain embodiments, a particular software component may comprise disparate instructions stored in different locations of a computer-readable storage medium, which together implement the described functionality of the component. Indeed, a component may comprise a single instruction or many instructions, and may be distributed over several different code segments, among different programs, and across several computer-readable storage media. Some embodiments may be practiced in a distributed computing environment where tasks are performed by a remote processing device linked through a communications network.

The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing the processes, apparatuses, and system described herein. Accordingly, the present embodiments are to be considered illustrative and not restrictive, and the invention is not to be limited to the details given herein, but may be modified within the scope and equivalents of the appended claims.

As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus.

It will be obvious to those having skill in the art that many changes may be made to the details of the above-described embodiments without departing from the underlying principles of the invention. The scope of the present invention should, therefore, be determined only by the following claims.

The invention claimed is:

1. A vehicle charging station comprising:
a power distribution interface for providing electrical power to a power receiving interface of a vehicle, the power receiving interface configured to receive the electrical power to replenish an energy source of the vehicle;
a receiver component for determining identification information corresponding to the vehicle, the identification information uniquely identifying the vehicle, wherein the receiver component is positioned to determine the identification information corresponding to the vehicle when the power receiving interface is in electrical communication with the power distribution interface; and
an authorization component configured to determine whether the vehicle is specifically authorized for refueling based on the identification information uniquely identifying the vehicle, wherein the authorization component determines that the vehicle is specifically authorized based on determining that the identification information corresponds to an entry in a list of preauthorized vehicles, and wherein the authorization component is further configured to allow flow of electrical power to the vehicle in response to authorization based on the received identification information.

2. The vehicle charging station of claim 1, wherein the power distribution interface comprises a power cable extending from the vehicle charging station, the power cable comprising an outlet plug.

3. The vehicle charging station of claim 2, wherein the outlet plug complies with a vehicle recharging standard.

4. The vehicle charging station of claim 1, wherein the receiver component receives the identification information from an identification component, wherein the receiver component comprises a radio frequency identification (RFID) tag reader and the identification component comprises an RFID tag.

5. The vehicle charging station of claim 4, wherein the receiver component receives the identification information in response to providing a valid passcode to the identification component.

6. The vehicle charging station of claim 1, wherein the receiver component is positioned to align with an identification component of the vehicle when the power distribution interface is electrically coupled to the power receiving interface, wherein alignment of the receiver component with the identification component allows electrical communication between the identification component and the receiver component.

7. The vehicle charging station of claim 1, further comprising an indicator light for indicating one or more of a charge status and an authorization status for the vehicle.

8. The vehicle charging station of claim 1, wherein the authorization component is configured to determine whether the vehicle is specifically authorized without authorizing with a remote device or server.

9. The vehicle charging station of claim 1, wherein the list of preauthorized vehicles is maintained locally to the vehicle charging station.

10. The vehicle charging station of claim 9, further comprising an authorization update component configured to update the list of preauthorized vehicles on an update period, wherein the update period is greater than or equal to about an hour.

11. The vehicle charging station of claim 1, wherein the authorization component is configured to allow flow of electrical power without initiating a payment transaction.

12. A system comprising:
a vehicle charging station comprising,
a power distribution interface for providing electrical power to replenish an energy source of a vehicle,
a receiver component for determining identification information uniquely identifying the vehicle, and
an authorization component configured to determine whether the vehicle is specifically authorized for refueling based on the identification information uniquely identifying the vehicle, wherein the authorization component determines that the vehicle is specifically authorized based on determining that the identification information corresponds to an entry in a list of preauthorized vehicles, and wherein the authorization component is further configured to allow flow of electrical power to the vehicle in response to authorization based on the received identification information; and
a vehicle charging interface comprising,
a power receiving interface for receiving electrical power from the power distribution interface to charge the vehicle; and
an identification component comprising the identification information, the identification information uniquely identifying the vehicle;
wherein the receiver component is positioned to determine the identification information corresponding to the vehicle when the power distribution interface and fuel receiving interface are in electrical communication.

13. The system of claim 12, wherein the receiver component receives the identification information in response to coupling of the distribution interface and the fuel receiving interface.

14. The system of claim 12, wherein the power distribution interface comprises an outlet plug attached to the vehicle distribution station via a power cable and the power receiving interface comprises a vehicle inlet on the body of the vehicle.

15. The system of claim 14, wherein one or more of:
the outlet plug and power cable comply with a society of automotive engineers (SAE) J1772 standard; and
the vehicle inlet complies with a society of automotive engineers (SAE) J1772 standard.

16. The system of claim 14, wherein the outlet plug comprises an indicator light, the indicator light indicating one or more of an authorization status of the vehicle and a charging status of the vehicle.

17. The system of claim 14 wherein the receiver component comprises an RFID reader, the RFID reader comprises an antenna located to align with an RFID tag, and at least a portion of the RFID reader is embedded in the outlet plug.

18. The system of claim 14, wherein the distribution interface comprises a first wireless power coupling and the fuel receiving interface comprises a second wireless power coupling wherein the first and second wireless power couplings wirelessly electrically couple to charge the vehicle.

19. The system of claim 14, further comprising a flow component for selectively allowing flow of electricity between the vehicle charging station and the vehicle charging interface in response to receiving a signal indicating authorization for the vehicle.

20. A method for providing a refueling subscription comprising:
determining a maximum amount of electrical charge a vehicle can consume within a subscription time period, the maximum amount determined based on an energy usage rate, an amount of energy storage, and a charge rate for recharging the vehicle;
determining identification information for the vehicle; and
allowing unlimited fueling at a fuel distribution station for the subscription time period in response to the fuel distribution station detecting the identification information, wherein allowing unlimited fueling comprises allowing based on a determination that the vehicle is specifically authorized for refueling based on the identification information uniquely identifying the vehicle, wherein determining comprises determining that the identification information corresponds to an entry in a list of preauthorized vehicles.

21. The method of claim 20, further comprising affixing an identification component comprising the identification information to the vehicle, the identification component comprising a radio frequency identification (RFID) tag.

22. The method of claim 20, wherein allowing unlimited fueling comprises maintaining identification corresponding to the vehicle on the list of preauthorized vehicles during the subscription time period locally to the fuel distribution station.

23. The method of claim 22, further comprising updating on an update period the list of preauthorized vehicles at the fuel distribution station.

24. The method of claim 23, wherein the update period is greater than or equal to about an hour.

25. The method of claim 23, wherein the update period is greater than or equal to about a day.

* * * * *